United States Patent
Mehlen (10) Patent No.: US 9,475,353 B2
(45) Date of Patent: Oct. 25, 2016

(54) SWING-AWAY HITCH ADAPTER SYSTEM

(71) Applicant: William Dean Mehlen, Lethbridge (CA)

(72) Inventor: William Dean Mehlen, Lethbridge (CA)

( * ) Notice: Subject to any disclaimer, the term of this patent is extended or adjusted under 35 U.S.C. 154(b) by 0 days.

(21) Appl. No.: 14/884,037

(22) Filed: Oct. 15, 2015

(65) Prior Publication Data

US 2016/0129847 A1 May 12, 2016

Related U.S. Application Data (60) Provisional application No. 62/077,610, filed on Nov. 10, 2014.

(51) Int. Cl.
*B60R 9/06* (2006.01)
*B60D 1/58* (2006.01)
*B60R 11/00* (2006.01)

(52) U.S. Cl.
CPC ............. *B60D 1/58* (2013.01); *B60R 9/065* (2013.01); *B60R 9/06* (2013.01); *B60R 2011/0087* (2013.01)

(58) Field of Classification Search
CPC ............ B60R 9/06; B60R 2011/0087; B60R 2011/004
USPC .................. 224/509, 506, 507, 519; 414/462
See application file for complete search history.

(56) References Cited

U.S. PATENT DOCUMENTS

| | | | |
|---|---|---|---|
| 5,518,159 A * | 5/1996 | DeGuevara | B60R 9/10 224/282 |
| 5,544,799 A | 8/1996 | Didlake | |
| 5,664,717 A * | 9/1997 | Joder | B60R 9/10 224/502 |
| 5,806,737 A * | 9/1998 | Clark | B60R 9/06 224/485 |
| 5,857,824 A | 1/1999 | De Aquiar | |
| 6,237,823 B1 * | 5/2001 | Stewart | B60R 9/065 224/282 |
| 6,386,410 B1 * | 5/2002 | Van Dusen | B60R 9/06 224/509 |
| 6,701,913 B1 * | 3/2004 | LeDuc | B60R 9/06 126/276 |
| 6,722,380 B1 * | 4/2004 | Hafer | B60R 9/06 135/16 |
| 7,261,229 B1 | 8/2007 | Allen | |
| 7,591,404 B2 * | 9/2009 | LeDuc | F24C 15/30 126/276 |
| 7,631,791 B1 * | 12/2009 | Allen | B60R 9/10 224/503 |
| 8,286,843 B2 | 10/2012 | Bogoslofski | |
| 9,381,868 B2 * | 7/2016 | Anyan | B60R 9/10 |
| 2004/0112369 A1 * | 6/2004 | LeDuc | F24C 15/30 126/276 |
| 2005/0184013 A1 | 8/2005 | Frazeur | |
| 2006/0273125 A1 * | 12/2006 | Bogoslofski | B60R 9/10 224/509 |
| 2012/0118928 A1 | 5/2012 | Law | |
| 2012/0292357 A1 * | 11/2012 | Tennyson | B60R 9/065 224/281 |
| 2012/0305612 A1 * | 12/2012 | Bell, Jr. | B60R 9/06 224/519 |
| 2015/0203049 A1 * | 7/2015 | Eichmann | B60D 1/42 224/509 |
| 2016/0129847 A1 * | 5/2016 | Mehlen | B60R 9/065 224/509 |

* cited by examiner

*Primary Examiner* — Justin Larson
(74) *Attorney, Agent, or Firm* — Integrity Patent Group PLC (57) ABSTRACT

A swing-away hitch adapter system couples a vehicle hitch mounted device of a vehicle while maintaining the ability of the user to access the rear storage of the vehicle. The swing-away hitch adapter has a receiver insert, a base-member, a secondary-member, a hitch receiver, a hinge-pin, a swing-limiting pin, a restraining-pin, and a return limiting pin. Additional embodiments of a swing-away hitch adapter system may further include a wiring harness extension, a plug adapter, a handle attached to the secondary-member, a handle attached to the restraining-pin, and a wire attached to the restraining-pin. The swing-away hitch adapter system, in a folded condition, is ready for transportation of the vehicle. When in a swing-away condition, the swing-away hitch adapter system allows access to the rear entry of the vehicle.

20 Claims, 5 Drawing Sheets

SWING-AWAY HITCH ADAPTER SYSTEM

CROSS-REFERENCE TO RELATED APPLICATION

The present application is related to and claims priority from prior provisional application Ser. No. 62/077,610, filed Nov. 10, 2014 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of vehicle trailer hitch accessories and more specifically relates to a swing-away hitch adapter system.

2. Description of Related Art

Many people in modern society drive vehicles between locations for work and/or pleasure. Many individuals also ride bicycles and motorcycles for the same reasons. Bicyclists may ride for exercise and to get to locations not easily accessible by conventional road vehicles. Sometimes these locations may be a very long distance from where the individual resides and thus may not be practical unless the bicycle is able to be loaded and carried to the location using a car, truck, or other vehicle.

Loading and carrying bicycles between locations may be difficult due to cargo capacity limitations of vehicles. Some individuals may choose to secure the bicycles to the roof of the vehicle, however, this may cause wind resistance for the vehicle and may not be safe. Further, placement as such may prove difficult to secure and remove the bicycle given the height. Damage may result to the roof of the vehicle using this means for bicycle transport. Other individuals may load the bicycle(s) into the bed of the truck which may use valuable cargo space. Yet other individuals may fasten the bicycles to the back of a vehicle by use of a specialized rack, but this may limit access into and from the bed of the truck or rear access to the interior of the vehicle. This is not desirable.

Additionally, the standard vehicle may not have adequate storage space to transport items necessitating external cargo storage. A popular method of transporting such items is with a hitch-mounted cargo device. One limitation with such a device is that it can again limit the access to the rear entry of a vehicle, especially in vehicles having swing-away tailgates. Therefore a suitable solution is needed to carry items such as bicycles and cargo with the use of a rear, hitch-mounted device while not restricting rear access to a vehicle.

Several attempts have been made to solve the above-mentioned problems such as those found in U.S. Pat. No. 5,544,799 to Didlake, U.S. Pat. No. 5,857,824 to De Aquiar, U.S. Pat. No. 7,261,229 to Allen et al., U.S. Pat. No. 8,286,843 to Bogoslofski et al., 2005/0184013 to Frazeur, and 2012/0118928 to Law et al. This art is representative of vehicle trailer hitch accessories. However, none of the above inventions and patents, taken either singly or in combination, is seen to describe the invention as claimed.

Preferably, a swing-away hitch adapter system should provide a means to utilize a vehicle-hitch mounted device to carry cargo or other items on the rear of the vehicle while not limiting access to the rear entry of the vehicle, and, yet would operate reliably and be manufactured at a modest expense. Thus, a need exists for a reliable swing-away hitch adapter system to avoid the above-mentioned problems.

BRIEF SUMMARY OF THE INVENTION

In view of the foregoing disadvantages inherent in the known hitch-mounted accessory art, the present invention provides a novel swing-away hitch adapter system. The general purpose of the present invention, which will be described subsequently in greater detail is to provide a swing-away hitch adapter system that allows the user to maintain access to a rear-entry of a vehicle while using a hitch-mounted device, yet carry items as desired.

The present invention advantageously fills the aforementioned deficiencies by providing a safe and easy to use means for loading bicycles onto a hitch mounted in a receiver of a vehicle. The present invention is superior to other systems in that it effectively allows for a range of movement of the carried item such that access to the vehicle is not restricted.

A swing-away hitch adapter system is disclosed herein, in preferred embodiments, comprising a swing-away hitch adapter assembly. The swing-away hitch adapter assembly comprises a receiver-insert, a base-member, a secondary-member, a hitch-receiver, a hinge-pin, a swing-limiting pin, a restraining-pin, and a return-limiting pin.

The receiver-insert is structured and arranged to be removably insertable into a standard receiver hitch of a vehicle. Locationally speaking, the receiver-insert is affixed to the base-member, perpendicularly to the base-member. The hitch-receiver is affixed to the secondary-member, perpendicularly to the secondary-member, where the hitch-receiver is structured and arranged to accept a vehicle-hitch mounted device. In some embodiments, the receiver-end of the hitch-receiver may further comprise a reinforced lip to protect against damage to the receiver-end while the swing-away hitch adapter assembly is in use.

The base-member and the secondary-member are hingedly attached to each other via the hinge-pin such that the base-member is rotatable through a predetermined angle respective to the base-member. Additionally, the secondary-member is positioned in a plane above the base-member, where the secondary-member and the base-member are able to move relative to each other.

The restraining-pin is removably insertable through both the base-member and the secondary-member such that the base-member and the secondary-member are able to be restrained from relative movement by the restraining-pin when in a folded condition. Alternately, when the swing-away hitch adapter assembly is in a swing-away condition, the swing-limiting pin adjustably stops the secondary-member at a predetermined position; the predetermined position being able to be set and adjustable by a user. In certain embodiments, the predetermined position may include an extended-angle of 90 degrees. In alternate embodiments, the extended-angle may be less than 90 degrees. In yet another embodiment, the extended-angle may be greater than 90 degrees. The present invention as designed allows a range of movement. The return-limiting pin is affixed to the receiver-insert to prevent the secondary-member from rotating to a negative-angle in relation to the base-member.

The swing-away hitch adapter assembly is structured and arranged such that the swing-away hitch adapter assembly is able to be coupled to the vehicle to engage portable items and yet allow full access to a rear entry on the vehicle when the swing-away hitch adapter assembly is in the swing-away condition (to one side of the vehicle or the other depending on how it is mounted). In some embodiments, the vehicle may comprise a cargo hatch access as the rear entry which opens horizontally. In other embodiments, the cargo hatch access may open vertically. The present invention is able to accommodate both versions of openings for tailgates (vertical or horizontal). The vehicle hitch-mounted device may comprise a carrier for an all-terrain vehicle, a cargo storage device, a bicycle rack, or other suitable apparatuses that may be affixed to a vehicle hitch.

In certain embodiments, the swing-away hitch adapter system also comprises a wiring harness extension useful for coupling an electrical system of the vehicle such that the electrical system can be remotely accessed for power usage. In other embodiments, the swing-away hitch adapter system further comprises a plug adapter affixed to the secondary-member to accept a wiring plug adapter from a vehicle-hitch mounted device to further allow the user access to the vehicle electrical system.

The hinge-pin of the swing-away hitch adapter assembly is removable and reinstallable to a second-position such that the swing-away hitch adapter system is able to be inverted when installed to rotate in an opposite direction such that the swing-away hitch adapter assembly is able to swing to a left-side of the vehicle and alternately a right-side of the vehicle, as per mounted orientation.

In some embodiments, the restraining-pin is coupled to the base-member via a wire to prevent loss of the restraining-pin when the restraining-pin is removed from the swing-away hitch adapter assembly. Additionally, the secondary member may further comprise a handle to aid the user in rotating the secondary-member in some embodiments. Further, the restraining-pin may further comprise a pin-handle to aid the user in removing the restraining-pin from the swing-away hitch adapter assembly, making it convenient for use. In some embodiments, the base-member and the secondary-member may be of equal length. In alternate embodiments, the base-member may be shorter in length than said secondary member. In yet another embodiment, the base-member may be greater in length that the secondary-member.

A kit is also described for manufacture, sale and use. The kit includes, at least, the receiver-insert, the base-member, the secondary-member, the hitch-receiver, the hinge-pin, the swing-limiting pin, the restraining-pin, the return-limiting pin, the wiring harness extension, the plug adapter, and a set of user instructions.

A method of using a swing-away hitch adapter system is also described herein for use with the present invention. The method comprising the steps of providing a swing-away hitch adapter assembly, installing the swing-away hitch adapter assembly on a vehicle, installing a vehicle-hitch mounted device in the swing-away hitch adapter assembly, removing the restraining-pin, and rotating the secondary-member from the folded condition to a swing-away condition. The method of using the swing-away hitch adapter system may further include the steps of returning the secondary-member to the folded position from the swing-away condition and inserting the restraining-pin and inverting as desired if wanting the swing to go in another direction. The device may be stored between uses.

The present invention holds significant improvements and serves as a swing-away hitch adapter system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, swing-away hitch adapter system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to vehicle trailer hitch accessories and more particularly to a swing-away hitch adapter system as used to allow a user to carry a vehicle-hitch mounted accessory while maintaining access to the rear entry of the vehicle such as a tailgate (regardless of how it opens and closes).

Generally speaking, the swing-away hitch adapter system accepts a standard vehicle hitch-mounted device for transport when the swing-away hitch adapter system is in a folded condition. When access to the rear entry of the vehicle is desired, the swing-away hitch adapter system may be rotated outwardly to a predetermined angle to give the user such access in a swing-away condition.

Figure 1:
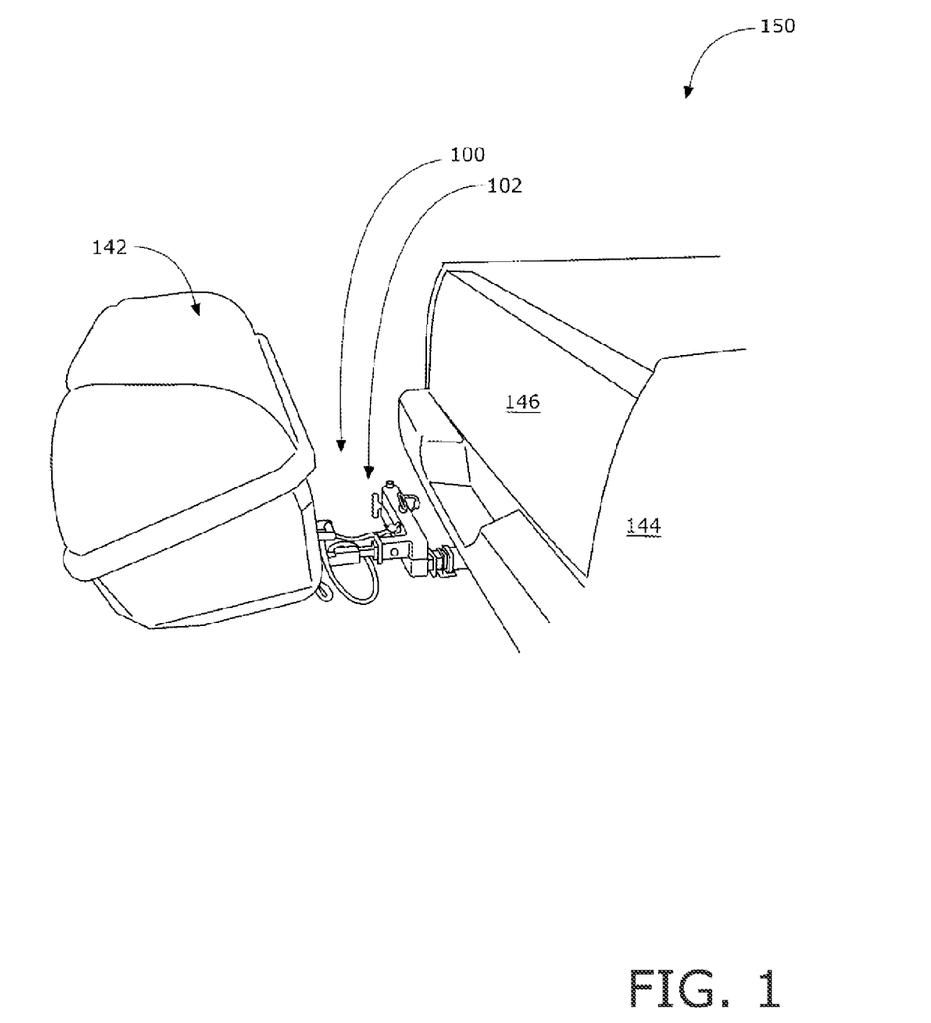
FIG. 1 shows a perspective view illustrating a swing-away hitch adapter system during an 'in-use' condition according to an embodiment of the present invention.
Figure 2:
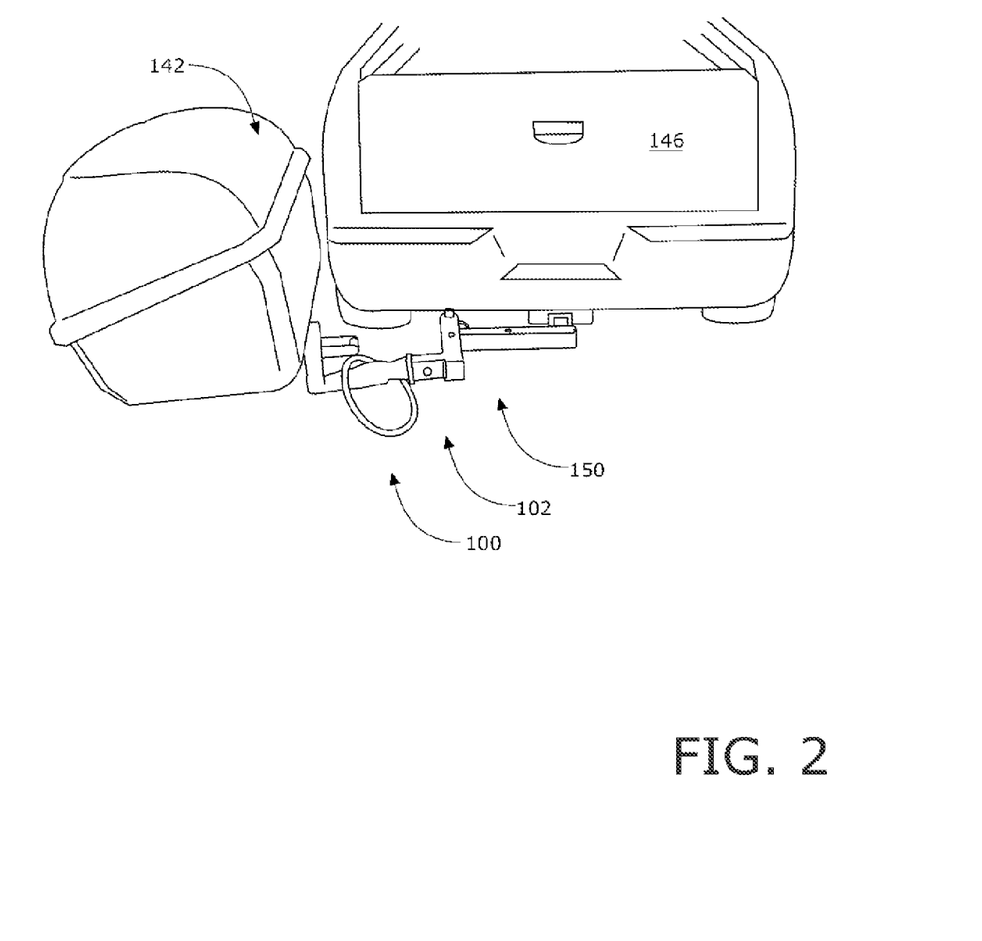
FIG. 2 is a perspective view illustrating the swing-away hitch adapter system during an 'in-use' condition according to an embodiment of the present invention of FIG. 1.

Referring to the drawings by numerals of reference there is shown in FIG. 1-5, various views of swing-away hitch adapter system 100 comprising swing-away hitch adapter assembly 102. Referring specifically to FIGS. 1-2, swing-away hitch adapter system 100 is shown during 'in-use' condition 150 according to an embodiment of the present invention.

Figure 3:
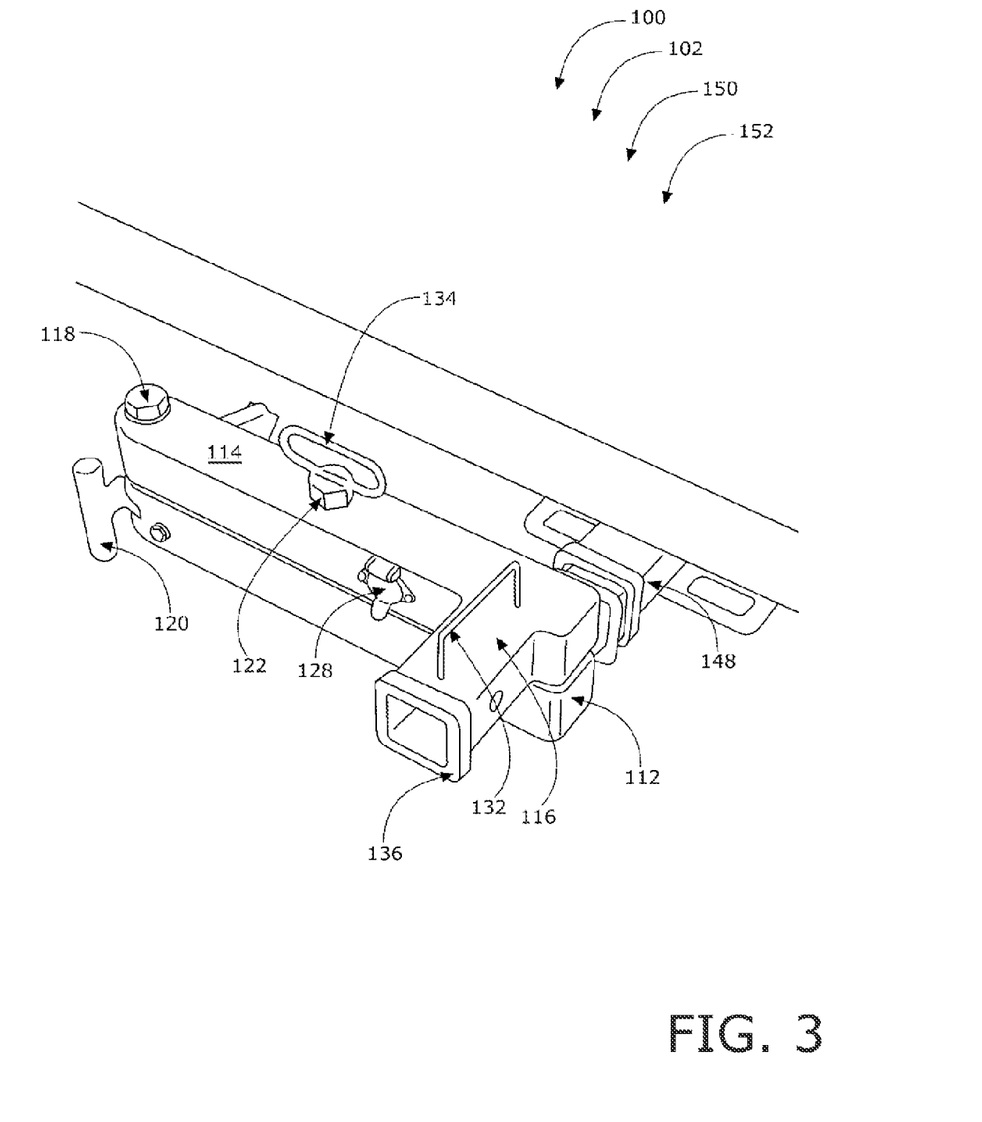
FIG. 3 is a perspective view illustrating the swing-away hitch adapter system in a folded condition according to an embodiment of the present invention.
Figure 4:
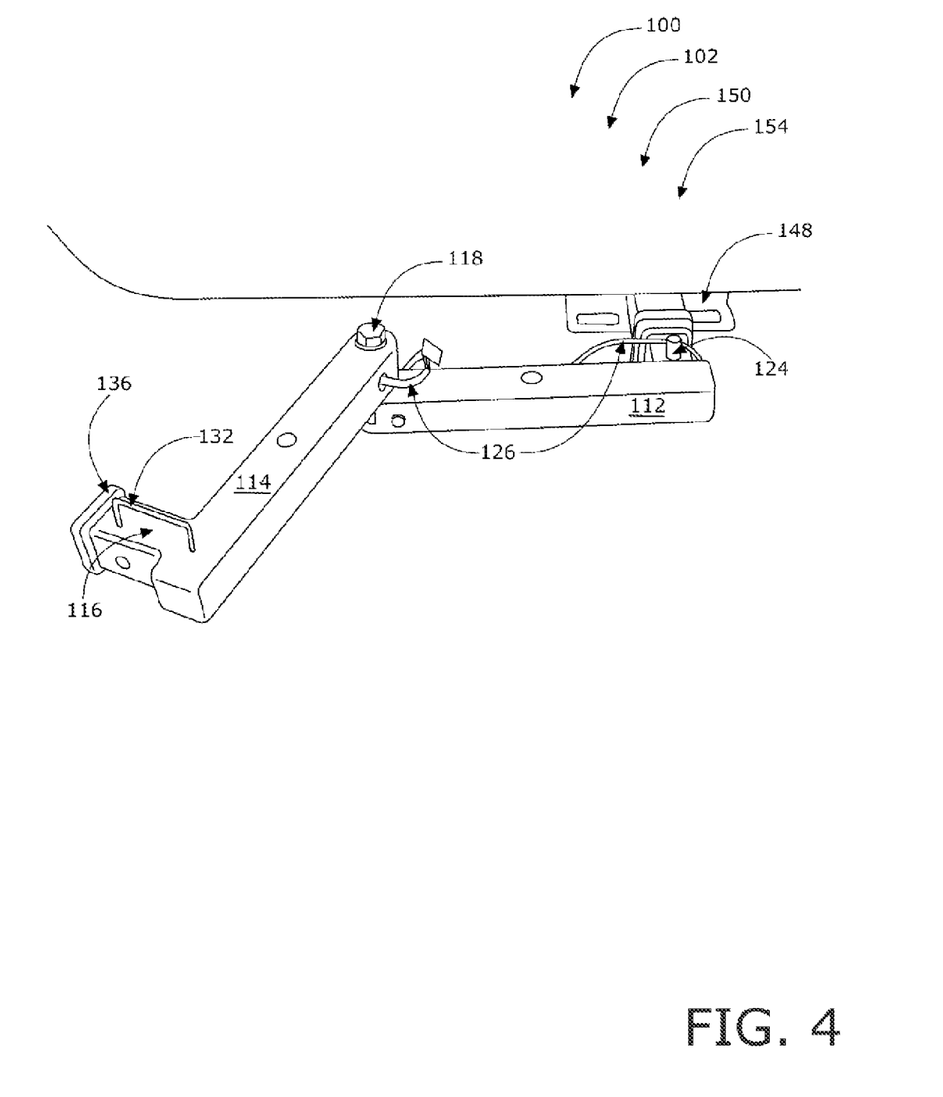
FIG. 4 is a perspective view illustrating the swing-away hitch adapter system in a swing-away condition according to an embodiment of the present invention.
Figure 5:
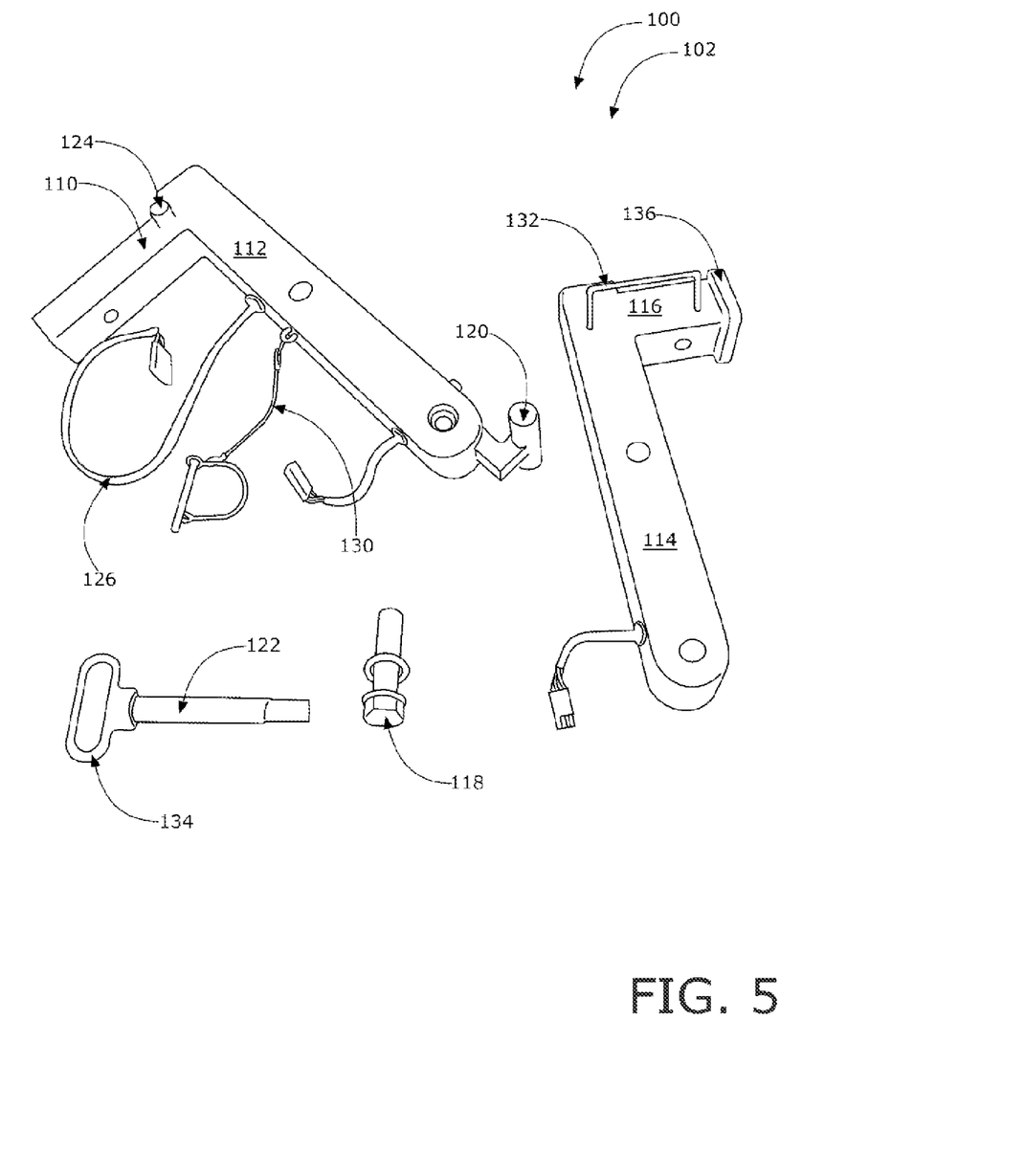
FIG. 5 is an exploded view of a swing-away hitch adapter system according to an embodiment of the present invention.

As shown in FIGS. 3-5, swing-away hitch adapter system 100 comprises swing-away hitch adapter assembly 102, with away hitch adapter assembly 102 comprising receiver-insert 110, base-member 112, secondary-member 114, hitch-receiver 116, hinge-pin 118, swing-limiting pin 120, restraining-pin 122, and return-limiting pin 124. Locationally speaking, receiver-insert 110 is affixed to base-member 112 and perpendicular to base-member 112, where hitch-receiver 116 is affixed to secondary-member 114 and perpendicular to secondary-member 114. In some embodiments, a receiver-end of hitch-receiver 116 may further comprise a reinforced lip 136 to protect against damage to the receiver-end while swing-away hitch adapter assembly 102 is in use.

Base-member 112 and secondary-member 114 are hingedly attached to each other via hinge-pin 118 such that base-member 112 is rotatable through a predetermined angle, set by a user, respective to base-member 112. Additionally, secondary-member 114 is positioned in a plane above base-member 112, with secondary-member 114 and base-member 112 able to move relative to each other. Receiver-insert 110 is structured and arranged to be removably insertable into a standard receiver hitch of a vehicle 148 and hitch-receiver 116 is structured and arranged to accept a vehicle-hitch mounted device 142.

When swing-away hitch adapter assembly 102 is in folded condition 152, restraining-pin 122 is removably insertable through both base-member 112 and secondary-member 114 such that base-member 112 and secondary-member 114 are able to be restrained from relative movement. When swing-away hitch adapter assembly 102 is in swing-away condition 154, swing-away hitch adapter assembly 102 is structured and arranged when coupled to vehicle 144 to engage portable items and yet allow full access to rear entry 146 on vehicle 144.

When swing-away hitch adapter assembly 102 is in swing-away condition 154, swing-limiting pin 120 adjustably stops secondary-member 114 at a predetermined position. Return-limiting pin 124 is affixed to receiver-insert 110 to prevent secondary-member 114 from rotating to a negative-angle in relation to base-member 112.

In some embodiments, swing-away hitch adapter system 100 may further comprise wiring harness extension 126 useful for coupling an electrical system of vehicle 144 such that an electrical system can be remotely accessed for power usage. Similarly, swing-away hitch adapter system 102 may further comprise plug adapter 128 affixed to secondary-member 114 to accept a wiring plug adapter from vehicle-hitch mounted device 142.

Certain embodiments of swing-away hitch adapter system 100 may be configured such that swing-limiting pin 120 may limit secondary-member 114 from rotating to an extended-angle of 90 degrees with respect to base-member 112. In other embodiments, swing-away hitch adapter system 100 may be configured such that swing-limiting pin 120 limits secondary-member 114 from rotating to an extended-angle of less than 90 degrees with respect to base-member 112, or alternately, to an extended-angle of greater than 90 degrees with respect to base-member 112.

Embodiments of swing-away hitch adapter system 100 may be arranged such that hinge-pin 118 is removable and reinstallable to a second-position such that swing-away hitch adapter system 100 is able to be inverted when installed to rotate in an opposite direction such that swing-away hitch adapter assembly 102 is able to swing to a left-side of vehicle 144, and alternately, a right-side of vehicle 144.

Additional embodiments of swing-away hitch adapter system 100 may further comprise restraining-pin 122 coupled to base-member 112 via wire 130 to prevent loss of restraining-pin 122 when restraining-pin 122 is removed from swing-away hitch adapter assembly 102. Secondary member 114 may further comprise handle 132 to aid user in rotating secondary-member 114. In embodiments, restraining pin 122 may further comprise pin-handle 134 to aid user in removing restraining-pin 122 from swing-away hitch adapter assembly 102.

Embodiments of swing-away hitch adapter system 100 may include arrangements where base-member 112 and secondary-member 114 are of equal length. Other embodiments may include arrangements where base-member 112 is greater in length than secondary-member 114, or where base-member 112 is shorter in length than secondary-member 114.

Vehicle 144 may comprise a cargo access hatch as rear entry 146 which opens horizontally (about a centerline axis), or vehicle 144 may comprise a cargo access hatch as rear entry 146 which opens vertically (about a centerline axis). The vehicle-hitch mounted device 142 may comprise a carrier for an all-terrain vehicle, a cargo storage device, a bicycle rack, or other equipment.

Referring now to FIG. 4, showing swing-away hitch adapter system 100 showing swing-away hitch adapter system 100 may be sold as a kit comprising the following parts: at least one receiver-insert 110 at least one base-member 112; at least one secondary-member 114; at least one hitch-receiver 116; at least one hinge-pin 118; at least one swing-limiting pin 120; at least one restraining-pin 122; at least one return-limiting 124; at least one wiring harness extension 126; at least one plug adapter 128; and at least one set of user instructions. The kit has instructions such that functional relationships are detailed in relation to the structure of the invention (such that the invention can be used, maintained, or the like in a preferred manner).

Swing-away hitch adapter system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

A method of use for swing-away hitch adapter system 100 according to an embodiment of the present invention of FIGS. 1-5 is disclosed herein. Method of use may comprise the steps of: step one, providing a swing-away hitch adapter assembly 102; step two, installing the swing-away hitch adapter assembly 102 on a vehicle 144; step three, installing a vehicle-hitch mounted device 142 in the swing-away hitch adapter assembly 102; step four, removing the restraining-pin 122; step five, rotating the secondary-member 114 from the folded condition 152 to a swing-away condition 154; step six, retuning the secondary-member 114 to the folded position 152 from the swing-away condition 154 and; step seven, inserting the restraining-pin 122. It should be noted that steps six and seven are optional steps of the method of use and may not be implemented in all cases.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A swing-away hitch adapter system comprising:
    a swing-away hitch adapter assembly comprising;
        a receiver-insert;
        a base-member;
        a secondary-member;
        a hitch-receiver;
        a hinge-pin;
        a swing-limiting pin;
        a restraining-pin; and
        a return-limiting pin;
    wherein said swing-away hitch adapter system comprises said swing-away hitch adapter assembly;
    wherein said swing-away hitch adapter assembly comprises in functional combination said receiver-insert, said base-member, said secondary-member, said hitch-receiver, said hinge-pin, said swing-limiting pin, said restraining-pin, and said return-limiting pin;
    wherein said receiver-insert is structured and arranged to be removably insertable into a standard receiver hitch of a vehicle;
    wherein said receiver-insert is affixed to said base-member perpendicularly to said base-member;
    wherein said base-member and said secondary-member are hingedly attached to each other via said hinge-pin such that said base-member is rotatable through a predetermined angle respective to said base-member;
    wherein said secondary-member is positioned in a plane above said base-member, said secondary-member and said base-member able to move relative to each other;
    wherein said hitch-receiver is perpendicular to said secondary-member;
    wherein said restraining-pin is removably insertable through said base-member and said secondary-member such that they are able to be restrained from relative movement when in a folded condition;
    wherein when said swing-away hitch adapter assembly is in a swing-away condition, said swing-limiting pin adjustably stops said secondary-member at a predetermined position;
    wherein said return-limiting pin is affixed to said receiver-insert to prevent said secondary-member from rotating to a negative-angle in relation to said base-member;
    wherein said hitch-receiver is structured and arranged to accept a vehicle-hitch mounted device; and
    wherein said swing-away hitch adapter assembly is structured and arranged when coupled to said vehicle to engage portable items and yet allow full access to a rear entry on said vehicle when said swing-away hitch adapter assembly is located in said swing-away condition.

2. The swing-away hitch adapter system of claim 1 further comprising a wiring harness extension useful for coupling an electrical system of said vehicle such that said electrical system can be remotely accessed for power usage.

3. The swing-away hitch adapter system of claim 2 further comprising a plug adapter affixed to said secondary-member to accept a wiring plug adapter from a vehicle-hitch mounted device.

4. The swing-away hitch adapter system of claim 1 wherein said swing-limiting pin limits said secondary-member from rotating to an extended-angle of 90 degrees with respect to said base-member.

5. The swing-away hitch adapter system of claim 1 wherein said swing-limiting pin limits said secondary-member from rotating to an extended-angle of less than 90 degrees with respect to said base-member.

6. The swing-away hitch adapter system of claim 1 wherein said swing-limiting pin limits said secondary-member from rotating to an extended-angle of greater than 90 degrees with respect to said base-member.

7. The swing-away hitch adapter system of claim 1 wherein said hinge-pin is removable and reinstallable to a second-position such that said swing-away hitch adapter system is able to be inverted when installed to rotate in an opposite direction such that said swing-away hitch adapter assembly is able to swing to a left-side of said vehicle and alternately a right-side of said vehicle.

8. The swing-away hitch adapter system of claim 1 wherein said restraining-pin is coupled to said base-member via a wire to prevent loss of said restraining-pin when said restraining-pin is removed from said swing-away hitch adapter assembly.

9. The swing-away hitch adapter system of claim 1 wherein said secondary member further comprises a handle to aid said user in rotating said secondary-member.

10. The swing-away hitch adapter system of claim 1 wherein said restraining-pin further comprises a pin-handle to aid said user in removing said restraining-pin from said swing-away hitch adapter assembly.

11. The swing-away hitch adapter system of claim 1 wherein a receiver-end of said hitch-receiver further comprises a reinforced lip to protect against damage to said receiver-end while said swing-away hitch adapter assembly is in use.

12. The swing-away hitch adapter system of claim 1 wherein said base-member and said secondary-member are of equal length.

13. The swing-away hitch adapter system of claim 1 wherein said base-member is shorter in length than said secondary member.

14. The swing-away hitch adapter system of claim 1 wherein said base-member is greater in length than said secondary member.

15. The swing-away hitch adapter system of claim 1 wherein said vehicle comprises a cargo access hatch as said rear entry which opens horizontally.

16. The swing-away hitch adapter system of claim 1 wherein said vehicle comprises a cargo access hatch as said rear entry which opens vertically.

17. The swing-away hitch adapter system of claim 1 wherein said vehicle-hitch mounted device comprises a carrier for an all-terrain vehicle.

18. The swing-away hitch adapter system of claim 1 wherein said vehicle-hitch mounted device comprises a cargo storage device.

19. The swing-away hitch adapter system of claim 1 wherein said vehicle-hitch mounted device comprises a bicycle rack.

20. A swing-away hitch adapter system comprising:
a swing-away hitch adapter assembly comprising;
   a receiver-insert;
   a base-member;
   a secondary-member;
   a hitch-receiver;
   a hinge-pin;
   a swing-limiting pin;
   a restraining-pin; and
   a return-limiting pin;
wherein said swing-away hitch adapter system comprises said swing-away hitch adapter assembly;
wherein said swing-away hitch adapter assembly comprises in functional combination said receiver-insert, said base-member, said secondary-member, said hitch-receiver, said hinge-pin, said swing-limiting pin, said restraining-pin, and said return-limiting pin;
wherein said receiver-insert is structured and arranged to be removably insertable into a standard receiver hitch of a vehicle;
wherein said receiver-insert is affixed to said base-member perpendicularly to said base-member;
wherein said base-member and said secondary-member are hingedly attached to each other via said hinge-pin such that said base-member is rotatable through a predetermined angle respective to said base-member;
wherein said secondary-member is positioned in a plane above said base-member, said secondary-member and said base-member able to move relative to each other;
wherein said hitch-receiver is perpendicular to said secondary-member;
wherein said restraining-pin is removably insertable through said base-member and said secondary-member such that they are able to be restrained from relative movement when in a folded condition;
wherein when said swing-away hitch adapter assembly is in a swing-away condition, said swing-limiting pin adjustably stops said secondary-member at a predetermined position;
wherein said return-limiting pin is affixed to said receiver-insert to prevent said secondary-member from rotating to a negative-angle in relation to said base-member;
wherein said hitch-receiver is structured and arranged to accept a vehicle-hitch mounted device;
wherein said swing-away hitch adapter assembly is structured and arranged when coupled to said vehicle to engage portable items and yet allow full access to a rear entry on said vehicle when said swing-away hitch adapter assembly is located in said swing-away condition;
wherein said swing-away hitch adapter assembly further comprises a wiring harness extension useful for coupling an electrical system of said vehicle such that said electrical system can be remotely accessed for power usage;
wherein said swing-away hitch adapter assembly further comprises a plug adapter affixed to said secondary-member to accept a wiring plug adapter from a vehicle-hitch mounted device;
wherein said swing-limiting pin limits said secondary-member from rotating to an extended-angle other than 90 degrees with respect to said base-member;
wherein said hinge-pin is removable and reinstallable to a second-position such that said swing-away hitch adapter system is able to be inverted when installed to rotate in an opposite direction such that said swing-away hitch adapter assembly is able to swing to a left-side of said vehicle and alternately a right-side of said vehicle;
wherein said restraining-pin is coupled to said base-member via a wire to prevent loss of said restraining-pin when said restraining-pin is removed from said swing-away hitch adapter assembly;
wherein said secondary member further comprises a handle to aid said user in rotating said secondary-member;
wherein said restraining-pin further comprises a pin-handle to aid said user in removing said restraining-pin from said swing-away hitch adapter assembly;
wherein said base-member and said secondary-member are of equal length; and
wherein a receiver-end of said hitch-receiver further comprises a reinforced lip to protect against damage to said receiver-end while said swing-away hitch adapter assembly is in use.

* * * * *